(12) United States Patent
Ishibashi et al.

(10) Patent No.: US 8,007,860 B2
(45) Date of Patent: Aug. 30, 2011

(54) METHOD FOR MANUFACTURING MAGNETIC RECORDING MEDIUM, AND MAGNETIC RECORDING AND REPRODUCING APPARATUS

(75) Inventors: Shinichi Ishibashi, Tokyo (JP); Yoshiko Takahashi, Ichihara (JP); Naoyuki Imai, Ichihara (JP); Masato Fukushima, Chiba (JP)

(73) Assignee: Showa Denko K.K., Tokyo (JP)

( * ) Notice: Subject to any disclaimer, the term of this patent is extended or adjusted under 35 U.S.C. 154(b) by 58 days.

(21) Appl. No.: 12/574,319

(22) Filed: Oct. 6, 2009

(65) Prior Publication Data
US 2010/0118441 A1   May 13, 2010

(30) Foreign Application Priority Data
Oct. 8, 2008   (JP) ................................. 2008-261800

(51) Int. Cl.
*G11B 5/82* (2006.01)
(52) U.S. Cl. ....................................... 427/128
(58) Field of Classification Search ............. 427/11, 427/128, 127, 130, 542, 508, 553, 596; 216/22
See application file for complete search history.

(56) References Cited

U.S. PATENT DOCUMENTS

| 2007/0134462 A1* | 6/2007 | Sinha et al. | 428/64.6 |
| 2008/0213501 A1* | 9/2008 | Inukai et al. | 427/488 |

FOREIGN PATENT DOCUMENTS

| JP | 01-43773 | B2 | 9/1989 |
| JP | 03-60336 | B2 | 9/1991 |
| JP | 05-039357 | A | 2/1993 |
| JP | 06-259709 | A | 9/1994 |
| JP | 08-143578 | A | 6/1996 |
| JP | 09-097419 | A | 4/1997 |
| JP | 2977218 | B2 | 11/1999 |
| JP | 3272002 | B2 | 4/2002 |
| JP | 2003-100609 | A | 4/2003 |
| JP | 2005-100496 | A | 4/2005 |
| JP | 2007-072374 | A | 3/2007 |

* cited by examiner

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

There is provided a method for manufacturing a magnetic recording medium which can easily produce a magnetic recording medium, the magnetic recording medium having a plurality of magnetically separated recording layers suitable as the recording layers in a discrete track medium or patterned medium, and also having excellent surface flatness, in which spaces between the adjacent recording layers are filled in with a non-magnetic material.

Such a method for manufacturing a magnetic recording medium is a method for manufacturing a magnetic recording medium (10) including: a step for forming a magnetic layer on top of a non-magnetic substrate (1), and then forming a resist pattern constituted of a non-magnetic material on top of the magnetic layer; a step for forming a concave section (4*a*), which is to become a separation layer (5), and a plurality of recording layers (4) that are magnetically separated in plan view by the concave section (4*a*) by removing the magnetic layer that is exposed from the resist pattern; and a step for forming the separation layer (5) by melting the resist pattern to prepare a melted resist and filling in the concave section (4*a*) with the melted resist, followed by curing of the melted resist.

9 Claims, 3 Drawing Sheets

METHOD FOR MANUFACTURING MAGNETIC RECORDING MEDIUM, AND MAGNETIC RECORDING AND REPRODUCING APPARATUS

FIELD OF THE INVENTION

The present invention relates to a method for manufacturing a magnetic recording medium to be used in a hard disk device or the like, and a magnetic recording and reproducing apparatus.

Priority is claimed on Japanese Patent Application No. 2008-261800, filed Oct. 8, 2008, the content of which is incorporated herein by reference.

DESCRIPTION OF RELATED ART

In recent years, the application range of magnetic recording and reproducing apparatuses, such as magnetic disk devices, floppy (registered trademark) disk devices, and magnetic tape devices, has increased remarkably, and the importance thereof has increased. Therefore, a technique for significantly improving the recording density of magnetic recording media used for these apparatuses has been developed.

In particular, since the introduction of a magnetoresistive head (MR head) and a Partial Response Maximum Likelihood (PRML) technique, increase in the surface recording density has accelerated even more. In recent years, with the introduction of a giant magnetoresistive head (GMR head), a tunnel magnetoresistive head (TMR head) or the like, the recording density has continued to increase at a rate of about 50% per year.

There is a demand for further increase in the recording density of these magnetic recording media in the future. In order to meet such demand, it has been desired to achieve a higher coercive force, a higher signal to noise ratio (S/N ratio) and a higher resolution for a magnetic recording layer.

In addition, in recent years, absolute film thickness of the magnetic recording media has been reduced in order to increase the surface recording density. However, when the absolute film thickness of the magnetic recording media is reduced, the phenomenon in which the extent of recorded magnetization is weakened due to thermal disturbance becomes apparent. Therefore, as the film thickness of the magnetic recording media reduces, thermal stability of the records therein has become a serious technical problem.

However, as shown below, the thermal stability tends to deteriorate when the S/N ratio is improved. That is, in a magnetic recording medium excellent in the S/N ratio, the crystal grain sizes of magnetic particles constituting the magnetic layer are fine in many cases. When the crystal grain sizes of magnetic particles constituting the magnetic layer are fine, it is effective in reducing the noise of the magnetic recording medium. But on the other hand, the thermal stability of the magnetic recording tends to become unstable. Therefore, it is difficult to improve both the S/N ratio and the thermal stability, and it is a target of research to develop a magnetic recording medium that satisfies both of the two properties.

In addition, in recent years, attempts have been constantly made to increase the surface recording density by increasing the track density together with the improvements in the line recording density. The most recent magnetic recording devices have a track density of 110 kTPI. However, magnetically recorded information on adjacent tracks interferes with itself along with increased track densities and noise may occur in the magnetic transition region at their boundaries, impairing the SN ratio. This directly results in deterioration of the bit error rate, which is a drawback to improving the recording density.

In addition, when the track density is increased, the distance between tracks will become small, and thus track servo techniques with extremely high precision have been employed in the magnetic recording device. Moreover, in order to eliminate as much influence as possible from adjacent tracks, recording is conducted widely whereas reproduction is performed in a smaller width than recording in a commonly adopted method. According to this method, inter-track influence can be minimized. On the other hand, it is difficult to obtain satisfactory reproduction output with this method, and thus a favorable level of S/N ratio is difficult to secure.

In addition, in recent years, as a technique in order to increase the record density of magnetic recording media, a perpendicular magnetic recording medium has been employed in which data is recorded by magnetizing a recording layer in the perpendicular direction with respect to the disk surface. Also in the perpendicular magnetic recording medium, there is a need to increase the track density in order to further improve the recording density. As in the case of a longitudinal magnetic recording medium in which data is recorded by magnetizing a recording layer parallel to the disk surface, also in the perpendicular magnetic recording medium, fringes occur at the end of recording sections when the track density is increased. As a technique for solving the problem of fringes, a discrete track medium in which interferences between adjacent tracks are prevented or a bit patterned medium in which patters of arbitrary shapes are regularly arranged has been proposed.

For example, in Patent Document 1, i.e. Japanese Unexamined Patent Application, First Publication No. Hei 6-259709, a discrete track medium has been disclosed in which a convex section is formed as a recording section whereas a concave section is formed as a guard band section. However, when a guard band section composed of concave sections is formed, this means the formation of a deep concave-convex pattern on the disk surface. The presence of a deep concave-convex pattern on the disk surface is not preferable since this may adversely affect the floating properties of recording and reproducing heads.

As a technique for solving the problems that arise from the concave-convex pattern on the disk surface in the case of forming a guard band section composed of concave sections, a discrete medium has been proposed in which spaces between the recording track sections are filled in with a guard band member, thereby planarizing the disk surface (for example, refer to Patent Document 2, i.e. Japanese Unexamined Patent Application, First Publication No. Hei 9-97419). In Patent Document 2, as a guard band member, oxides, nitrides, carbides, borides, and polymeric compounds have been exemplified. Moreover, in Patent Document 2, as a method for filling in the spaces between the recording track sections with a guard band member, a method is disclosed in which a guard band member is sputtered until the spaces between the recording track sections are completely filled in, followed by polishing of the disk surface to planarize, thereby preparing a disk where a recording track section appears on the surface thereof.

In addition, in Patent Document 3, i.e. Japanese Unexamined Patent Application, First Publication No. 2005-100496, a magnetic recording medium has been disclosed in which the concave section in a concave-convex pattern is filled in with a non-magnetic material. In Patent Document 3, a technique is disclosed for manufacturing a magnetic recording medium having a satisfactorily planarized surface by including a step for forming a layer, composed of a material having fluidity, on the surface of a processed material where a concave-convex pattern is provided on the surface. Moreover, in Patent Document 3, as a non-magnetic material having fluidity, indium (In) or an ultraviolet curable resin is disclosed.

In addition, in Patent Document 4, i.e. Japanese Unexamined Patent Application, First Publication No. 2007-072374, a film-forming composition for nanoprinting is disclosed which contains a polymeric silicon compound having a function to cause a photo-curing reaction. Moreover, in Patent Document 4, use of a siloxane-based polymeric compound as a polymeric silicon compound and use of those compounds having a weight average molecular weight between 1,000 and 50,000, have been disclosed.

In addition, in Patent Document 5, i.e. Japanese Unexamined Patent Application, First Publication No. 2003-100609, a method has been disclosed for forming a fine $SiO_2$ pattern on the surface of a processed material by coating a mixture composed of a hydrogenated silsesquioxane polymer and a solvent onto the surface of the processed material, embossing the fine pattern on the coated surface, followed by the solvent removal and hydrolysis and curing reactions.

However, because the conventional discrete track media and bit pattern media have magnetically separated recording layers, the manufacturing process thereof becomes complicated and time-consuming when making the media with excellent surface flatness, in which spaces between adjacent recording layers are filled in with a non-magnetic material, and thus there has been a demand for improvements in the productivity thereof.

The present invention has been made in view of the above circumstances and an object of the present invention is to provide a method for manufacturing a magnetic recording medium which can easily produce a magnetic recording medium, the magnetic recording medium having a plurality of magnetically separated recording layers suitable as the recording layers in a discrete track medium or patterned medium, and also having excellent surface flatness, in which spaces between the adjacent recording layers are filled in with a non-magnetic material.

In addition, another object of the present invention is to provide a magnetic recording and reproducing apparatus that includes a magnetic recording medium obtained by the method for manufacturing a magnetic recording medium according to the present invention and with which an excellent recording density as well as stable floating properties of the magnetic head are achieved.

SUMMARY OF THE INVENTION

The present inventors have conducted intensive and extensive studies in order to solve the above problems. As a result, the present inventors discovered the following and completed the present invention. That is, when manufacturing a discrete track medium or patterned medium, a plurality of recording layers that are magnetically separated by a separation layer can be readily formed by forming a resist pattern on a magnetic layer, which is to become a recording layer, and patterning the magnetic layer, melting the resist pattern to prepare a melted resist and filling in a concave section formed by the patterning of the magnetic layer with the melted resist, and curing the melted resist to form the separation layer.

Moreover, the present inventors conducted further intensive and extensive studies and found out that a resist pattern can be melted more efficiently at a high speed by laser irradiation.

Furthermore, the present inventors conducted further intensive and extensive studies on the materials for forming the separation layer, which can be used as a resist pattern and can also easily fill in the concave section, and discovered that use of a thermoplastic organic silicon compound as a material for forming the separation layer is preferred.

(1) A method for manufacturing a magnetic recording medium characterized by having: a step for forming a magnetic layer on top of a non-magnetic substrate, and then forming a resist pattern constituted of a non-magnetic material on top of the magnetic layer; a step for forming a concave section, which is to become a separation layer, and a plurality of recording layers that are magnetically separated in plan view by the concave section by removing the magnetic layer that is exposed from the resist pattern; and a step for forming the separation layer by melting the resist pattern to prepare a melted resist and filling in the concave section with the melted resist, followed by curing of the melted resist.

(2) The method for manufacturing a magnetic recording medium according to the above aspect (1), characterized in that the resist pattern is melted by irradiating a laser beam thereto.

(3) The method for manufacturing a magnetic recording medium according to the above aspect (2), characterized by further having a step for conducting a surface inspection using a laser beam after forming the separation layer.

(4) The method for manufacturing a magnetic recording medium according to any one of the above aspects (1) to (3), characterized in that the resist pattern is constituted of a thermoplastic organic silicon compound.

(5) The method for manufacturing a magnetic recording medium according to any one of the above aspects (1) to (4), characterized in that the thermoplastic organic silicon compound includes a silsesquioxane compound represented by general formula (1) shown below:

$$R^1R^2Si_2O_3 \quad (1)$$

(in the above general formula (1), $R^1$ and $R^2$ represent an alkyl group of 1 to 8 carbon atoms which may be substituted, an alkenyl group of 2 to 8 carbon atoms which may be substituted, an alkoxy group of 1 to 6 carbon atoms which may be substituted, or an aryl group of 6 to 10 carbon atoms which may be substituted, and $R^1$ and $R^2$ may be the same or different from each other.

(6) The method for manufacturing a magnetic recording medium according to the above aspect (5), characterized in that the silsesquioxane compound is constituted of a repeating unit having a structure represented by general formula (2) shown below and is a compound having a weight average molecular weight (the polystyrene equivalent value) determined by gel permeation chromatography of 1,000 to 100,000.

[Chemical Formula 1]

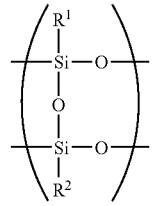

(2)

(In the above general formula (2), $R^1$ and $R^2$ represent an alkyl group of 1 to 8 carbon atoms which may be substituted, an alkenyl group of 2 to 8 carbon atoms which may be substituted, an alkoxy group of 1 to 6 carbon atoms which may be substituted, or an aryl group of 6 to 10 carbon atoms which may be substituted, and $R^1$ and $R^2$ may be the same or different from each other.

(7) The method for manufacturing a magnetic recording medium according to the above aspect (6), characterized in that $R^1$ and $R^2$ in the above general formula (2) represent a methyl group or a phenyl group.

(8) The method for manufacturing a magnetic recording medium according to any one of the above aspects (5) to (7), characterized in that the silsesquioxane compound is a compound having a weight average molecular weight (the polystyrene equivalent value) determined by gel permeation chromatography of 1,500 to 30,000.

(9) The method for manufacturing a magnetic recording medium according to any one of the above aspects (5) to (8), characterized in that the silsesquioxane compound is phenylsilsesquioxane.

(10) A magnetic recording and reproducing apparatus including a magnetic recording medium and a magnetic head that records information on the magnetic recording medium or reproduces the information therefrom, and characterized in that the magnetic recording medium is manufactured by the method according to any one of the above aspects (1) to (9).

The method for manufacturing a magnetic recording medium according to the present invention includes: a step for forming a magnetic layer on top of a non-magnetic substrate, and then forming a resist pattern constituted of a non-magnetic material on top of the magnetic layer; a step for forming a concave section, which is to become a separation layer, and a plurality of recording layers that are magnetically separated in plan view by the concave section by removing the magnetic layer that is exposed from the resist pattern; and a step for forming the separation layer by melting the resist pattern to prepare a melted resist and filling in the concave section with the melted resist, followed by curing of the melted resist. Therefore, the method is excellent in terms of productivity which can easily produce a magnetic recording medium, the magnetic recording medium having a plurality of magnetically separated recording layers suitable as the recording layers in a discrete track medium or patterned medium, and also having excellent surface flatness, in which spaces between adjacent recording layers are filled in with a non-magnetic material.

In addition, because the magnetic recording and reproducing apparatus of the present invention includes a magnetic recording medium obtained by the method for manufacturing a magnetic recording medium according to the present invention and having excellent surface flatness and also having a plurality of magnetically separated recording layers, an excellent recording density as well as stable floating properties of the magnetic head can be achieved.

DETAILED DESCRIPTION OF THE INVENTION

Hereinafter, the present invention will be described in detail with reference to the drawings. However, it should be noted that the present invention is in no way limited to the embodiments described below.
<Magnetic Recording Medium>

Figure 1:
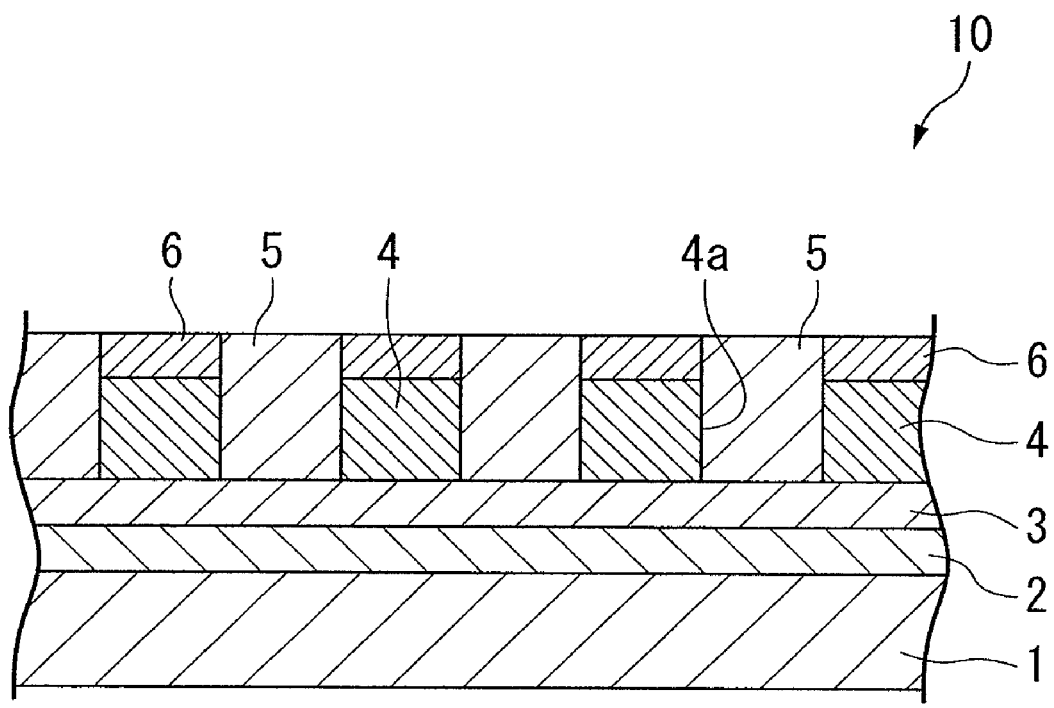
FIG. 1 is a cross sectional view showing an example of a magnetic recording medium manufactured by employing a method for manufacturing a magnetic recording medium according to the present invention, and is showing an enlarged view in which only one portion of the magnetic recording medium is enlarged.

FIG. 1 is a cross sectional view showing an example of a magnetic recording medium manufactured by employing a method for manufacturing a magnetic recording medium according to the present invention, and is showing an enlarged view in which only one portion of the magnetic recording medium is enlarged.

A magnetic recording medium 10 shown in FIG. 1 is a disk-shaped, perpendicular magnetic recording medium in which data is recorded by magnetizing a recording layer 4 in the perpendicular direction with respect to the disk surface, and thus it can be used suitably as a discrete track medium or a patterned medium.

The magnetic recording medium 10 shown in FIG. 1 includes a soft magnetic backing layer 2 provided on the surface of a disk-shaped non-magnetic substrate 1, an orientation control layer 3 provided on top of the soft magnetic backing layer 2, a recording layer 4 constituting a concentric recording track section having a predetermined width in a discrete track medium or a bit section in a patterned medium, a protective layer 6 provided on the recording layer 4, and a separation layer 5 formed so as to fill in a concave section 4a that is magnetically separating the adjacent recording layers 4 in plan view. It is preferable that a lubricating layer (not shown) be formed on top of the protective layer 6 and the separation layer 5.

As the non-magnetic substrate 1, any substrates can be used as long as they are non-magnetic substrates, and examples thereof include an Al alloy substrate made of, for example, an Al—Mg alloy having Al as a major component, and substrates made of crystallized glass, amorphous glass, silicon, titanium, ceramics, carbon, and various kinds of resins. As a substrate made of crystallized glass, lithium-based crystallized substrate or the like can be used. Examples of the substrate made of amorphous glass include substrates made of soda lime glass or aluminosilicate glass.

The average surface roughness Ra of the non-magnetic substrate 1 is preferably equal to or less than 1 nm and more preferably equal to or less than 0.5 nm. In those cases where the average surface roughness Ra of the non-magnetic substrate 1 is within the above-mentioned range, a favorable level of perpendicular orientation of the recording layer 4 is attained, and the extent of variation in the pressure distribution in an imprint process described later becomes small, thereby improving the uniformity of the processing. Thus, the above-mentioned range is preferable from these viewpoints. In addition, when the microwaviness (Wa) of the surface of the non-magnetic substrate 1 is equal to or less than 0.3 nm, the extent of variation in the pressure distribution in imprint process becomes small, thereby improving the uniformity of the processing and thus, the above-mentioned range is preferable from the above viewpoint.

Although there are no particular limitations on the material for the soft magnetic backing layer 2 as long as it is formed of a soft magnetic material, those formed of a material containing Fe, Co, or Ni can be used. Examples of the material containing Fe, Co or Ni include an FeCo alloy (FeCoB, FeCoSiB, FeCoZr, FeCoZrB, or the like), an FeTa alloy (FeTaN, FeTaC, or the like), and a Co alloy (CoTaZr, CoZrNb, CoB, or the like).

The soft magnetic backing layer 2 preferably has a laminated structure formed of a plurality of layers. The soft magnetic backing layer 2 can be made, for example, by providing a layer formed of Ru, Re, and Cu between the two soft magnetic films and making it into a predetermined thickness so that the two soft magnetic films that are present above and below the layer are antiferromagnetically coupled. By making the soft magnetic backing layer 2 to have such a laminated structure, it becomes possible to improve the wide area track erasure (WATE) phenomenon, which is a problem unique to perpendicular magnetic recording media.

The orientation control film 3 is a material for controlling the crystal orientation and crystal size of the recording layer 4 provided on top of the orientation control film 3. It is preferable for the material used for the orientation control film 3 to have an hcp structure or an fcc structure, and Ru is particularly desirable.

In addition, the thickness of the orientation control film 3 is preferably equal to or less than 30 nm. When the thickness of the orientation control film 3 exceeds 30 nm, the distance between the magnetic head and the soft magnetic backing layer 2 at the time of recording and reproducing becomes larger. Therefore, the overwrite (OW) characteristics and the resolution of the reproduced signals deteriorate, which is undesirable.

The recording layer 4 has an axis of easy magnetization in the perpendicular direction with respect to the substrate surface. Although known materials can be used for constituting the recording layer 4, it is preferable to use a magnetic alloy having a granular structure. It is particularly desirable to use a magnetic material having a granular structure that includes at least Co, Pt and an oxide, and it is even more preferable to further add elements such as Cr, B, Cu, Ta, and Zr thereto for purposes such as SNR characteristic improvement.

Examples of the oxide used when forming the recording layer 4 as a magnetic layer having a granular structure include $SiO_2$, $SiO$, $Cr_2O_3$, $CoO$, $Ta_2O_5$, and $TiO_2$. It is preferable that the volume fraction of the oxide in the recording layer 4 be within a range from 15 to 40 volume %. When the volume fraction of the oxide is less than 15 volume %, it is undesirable because the SNR characteristics become unsatisfactory. When the volume fraction of the oxide exceeds 40 volume %, it is undesirable because a satisfactory coercive force enough to cope with a high recording density cannot be achieved at times.

In addition, the nucleation magnetic field (−Hn) of the recording layer 4 is preferably equal to or greater than 1.5 (kOe). When −Hn is less than 1.5 (kOe), it is undesirable because thermal fluctuation occurs.

The thickness of the recording layer 4 is preferably within a range from 6 to 18 nm. When the thickness of the recording layer 4 is within this range, it is preferable because an adequate output can be ensured, and deterioration of the OW characteristics does not occur.

As a material for constituting the separation layer 5, a non-magnetic material can be used. More specifically, thermoplastic photoresists that are used industrially, thermoplastic organic silicon compounds, or the like can be used. Of these, it is particularly desirable to use a thermoplastic organic silicon compound as a material for constituting the separation layer 5. Thermoplastic organic silicon compounds are preferred because they have low viscosity in spite of their high molecular weight, and also because the extent of their shrinkage at the time of curing is minimal.

As the thermoplastic organic silicon compound, it is more preferable to use a compound which includes a silsesquioxane compound represented by general formula (1) shown below:

$$R^1R^2Si_2O_3 \tag{1}$$

In the above general formula (1), $R^1$ and $R^2$ represent an alkyl group of 1 to 8 carbon atoms which may be substituted, an alkenyl group of 2 to 8 carbon atoms which may be substituted, an alkoxy group of 1 to 6 carbon atoms which may be substituted, or an aryl group of 6 to 10 carbon atoms which may be substituted. In addition, $R^1$ and $R^2$ may be the same or different from each other.

Moreover, in the above general formula (1), it is preferable that $R^1$ and $R^2$ represent an alkyl group of 1 to 4 carbon atoms which may be substituted, an alkenyl group of 2 to 4 carbon atoms which may be substituted, an alkoxy group of 1 or 2 carbon atoms which may be substituted, or an aryl group of 6 or 7 carbon atoms which may be substituted.

Furthermore, in the above general formula (1), it is more preferable that $R^1$ and $R^2$ represent an alkyl group of 1 to 4 carbon atoms, an alkenyl group of 2 to 4 carbon atoms, or an aryl group of 6 or 7 carbon atoms from the viewpoints of maintaining the fluidity of the silsesquioxane compound and the rectangularity of the concave-convex pattern.

In addition, examples of the substituent include a halogen atom and a hydroxyl group.

Specific examples of those represented by the above $R^1$ and $R^2$ include an alkyl group of 1 to 8 carbon atoms such as a methyl group, an ethyl group, a propyl group, and a butyl group; an alkenyl group of 2 to 8 carbon atoms such as a vinyl group, an allyl group, and a butenyl group; an alkoxy group of 1 to 6 carbon atoms such as a methoxy group and an ethoxy group; and an aryl group of 6 to 10 carbon atoms such as a phenyl group and a tolyl group. Of these, it is particularly desirable that the above $R^1$ and $R^2$ represent a phenyl group and a methyl group from the viewpoint of capacity for maintaining the rectangularity of thin films at the time of embossing by a stamper.

In addition, it is desirable that the silsesquioxane compound be constituted of a repeating unit having a structure represented by the aforementioned general formula (2) and is a compound having a weight average molecular weight (the polystyrene equivalent value) determined by gel permeation chromatography of 1,000 to 100,000, from the viewpoints of maintaining the fluidity of the silsesquioxane compound and the rectangularity of the concave-convex pattern.

It should be noted that in the aforementioned general formula (2), $R^1$ and $R^2$ are the same as $R^1$ and $R^2$ in the aforementioned general formula (1).

These silsesquioxane compounds can be synthesized by a known method. For example, polymethylsilsesquioxane can be synthesized by adding methyltrichlorosilane in a ketone or ether solvent under the presence of an amine, dropwise adding water at a low temperature to hydrolyze methyltrichlorosilane, and further condensing the resulting hydrolyzed product (for example, refer to Japanese Examined Patent Application, Second Publication No. Hei 1-43773).

In addition, for example, polymethylsilsesquioxane can be synthesized by dissolving an alkali metal carboxylic acid salt and a lower alcohol in a mixed liquid in which two layers of water and an organic solvent are formed, dropwise adding methyltrichlorosilane to this reaction system to hydrolyze methyltrichlorosilane, and further condensing the resulting hydrolyzed product (for example, refer to Japanese Patent Publication No. 2977218).

Further, for example, polyphenylsilsesquioxane can be synthesized by hydrolyzing phenyltrichlorosilane to prepare a prepolymer or phenylsilanetriol, and further condensing the prepolymer or phenylsilanetriol in a toluene solvent under the presence of a basic catalyst while azeotropically removing the water produced by the condensation reaction to the outside of the reaction system (for example, refer to Japanese Examined Patent Application, Second Publication No. Hei 3-60336 and Japanese Unexamined Patent Application, First Application No. Hei 8-143578).

Moreover, for example, a low molecular weight polyphenylsilsesquioxane having superior compatibility with an organic solvent and a narrow molecular weight distribution can be synthesized by dissolving an alkali metal carboxylic acid salt and a lower aliphatic alcohol in a mixed liquid in which two layers of water and an organic solvent are formed, dropwise adding phenyltrichlorosilane to this reaction system to hydrolyze phenyltrichlorosilane, and further condensing the resulting product (for example, refer to Japanese Unexamined Patent Application, First Publication No. Hei 5-39357).

Furthermore, an ultrahigh molecular weight polymethylphenylsilsesquioxane can be synthesized by condensing a prepolymer, which is obtained by hydrolyzing methyltriethoxysilane and phenyltrimethoxysilane under the presence of an acid catalyst, in a methyl isobutyl ketone solvent under the presence of a basic catalyst (for example, refer to Japanese Patent Publication No. 3272002).

As described above, the silsesquioxane compounds that are favorably used in the present invention can be produced by various known methods, and are also commercially available.

These silsesquioxane compounds typically have a weight average molecular weight (the polystyrene equivalent value) determined by gel permeation chromatography (GPC) within a range from 1,000 to 100,000, and preferably within a range from 1,500 to 30,000. When the weight average molecular weight is less than 1,000, thermal stability of the thin film (resist) following a nanoimprinting process often deteriorates and problems such as heat sag arise at times. In addition, when the weight average molecular weight exceeds 100,000, fluidity of the resist solution applied to the surface of a processed material becomes low and an excessive pressure is required at the time of imprinting, which may shorten the longevity of the master (stamper).

As the protective layer 6, carbonaceous layers including carbon (C) such as diamond like carbon, hydrogenated carbon (HxC), nitrogenated carbon (CN), amorphous carbon, silicon carbide (SiC), and the like or protective layer materials, which are generally used as a protective layer in a magnetic recording medium, such as $SiO_2$, $Zr_2O_3$, and TiN, can be used.

In addition, the protective layer 6 may be a monolayer or may be constituted of two or more layers.

The thickness of the protective layer 6 is within a range from 1 to 10 nm and particularly preferably within a range from 1 to 5 nm. It is preferable to make the thickness of the protective layer 6 as thin as possible while ensuring satisfactory durability.

Examples of the lubricant used for the lubricating layer (not shown) include fluorine-based lubricants, hydrocarbon-based lubricants, and mixtures thereof. In addition, the lubricating layer is usually formed with a thickness of 1 to 4 nm.

<Method for Manufacturing a Magnetic Recording Medium>

Figure 2A:
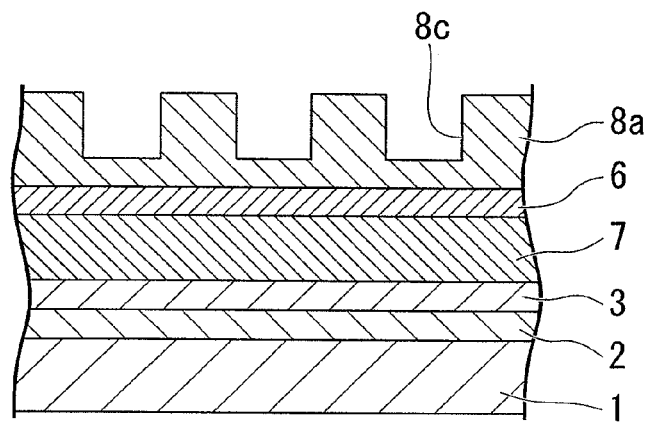
FIG. 2A is a diagram for explaining an example of a method for manufacturing the magnetic recording medium shown in FIG. 1.
Figure 2B:
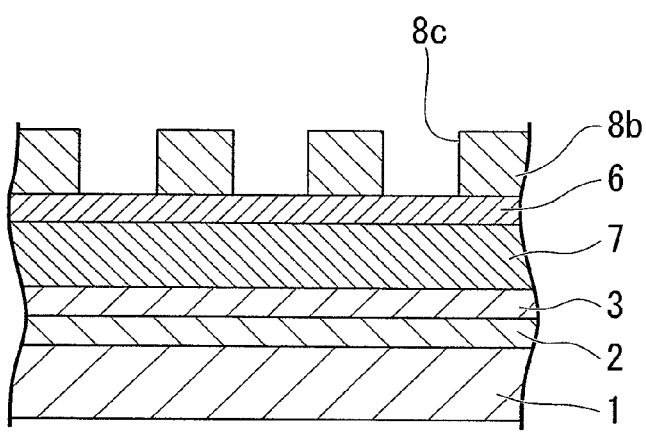
FIG. 2B is another diagram for explaining an example of a method for manufacturing the magnetic recording medium shown in FIG. 1.
Figure 2C:
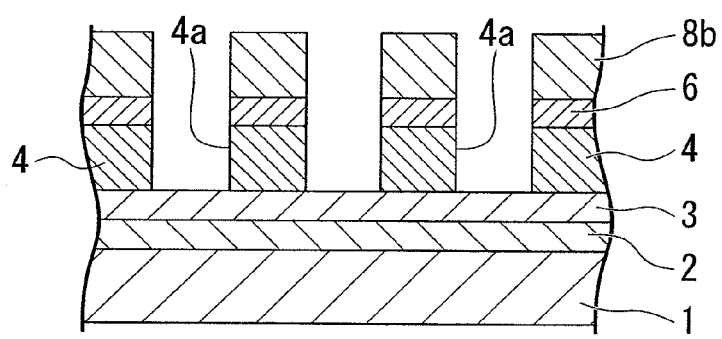
FIG. 2C is yet another diagram for explaining an example of a method for manufacturing the magnetic recording medium shown in FIG. 1.

Next, as an example of a method for manufacturing the magnetic recording medium according to the present invention, a method for manufacturing the magnetic recording medium shown in FIG. 1 will be described using FIGS. 2A to 2C. FIGS. 2A to 2C are diagrams for explaining an example of a method for manufacturing the magnetic recording medium shown in FIG. 1.

In order to manufacture the magnetic recording medium shown in FIG. 1, first, as shown in FIG. 2A, the soft magnetic backing layer 2, the orientation control layer 3, and the magnetic layer 7 which is to become the recording layer 4 are formed on top of the non-magnetic substrate 1 in this order using a thin film forming technique such as a plasma CVD process and a sputtering process, and then forming a protective layer 6 on top of the magnetic layer 7 using a thin film forming technique such as a plasma CVD process.

Subsequently, a resist solution which is to become a resist pattern 8 is applied onto the protective layer 6. When applying a resist solution, it is preferable to employ a spin coating process, a dip coating process, or the like which enables thin and uniform application. Note that the amount of resist solution applied or the thickness thereof is determined depending on the material of resist solution, volume of the concave section 4a which is to become the separation layer 5, and volume of a stamper, and is thus appropriately adjusted so that the levels of the upper surface of the recording layer 4 and the upper surface of the separation layer 5 become more or less horizontal.

Thereafter, in order to remove excess solvents or the like included in the resist solution, a baking process is conducted, if necessary, using a thermostatic bath, an oven, or the like. The baking temperature, baking time, or the like in this process can be appropriately adjusted in accordance with the properties of the resist solution used.

The resist solution used in this process is a solution containing a thermoplastic non-magnetic material, and although it may be a solution containing a thermoplastic photoresist used industrially or a thermoplastic organic silicon compound, a solution containing a thermoplastic organic silicon compound is preferred.

As the thermoplastic organic silicon compound, it is more preferable to use a compound which includes a silsesquioxane compound represented by the aforementioned general formula (1).

In addition, a solvent may be added to a resist solution, if necessary, in order to improve the coating properties of the resist solution. Examples of the solvents used here include ketone-based solvents such as methyl isobutyl ketone and cyclohexanone; aromatic hydrocarbon-based solvents such as toluene and xylene; ester-based solvents such as ethyl acetate, butyl acetate and propylene glycol monomethyl ether acetate; and alcohol-based solvents such as 2-propanol, butanol, hexanol, propylene glycol mono-n-propyl ether, and ethylene glycol monoethyl ether.

The amount of solvent used here is such that a silsesquioxane compound is within a range from 1 to 40% by mass, preferably within a range from 3 to 6% by mass, with respect to the solvent of 100% by mass.

Subsequently, the stamper having a concave-convex pattern, which is formed based on the shape of a concentric recording track section having a predetermined width in a discrete track medium or the shape of a bit section in a patterned medium, is brought into close contact with the protective layer 6 on which a resist solution is applied, and is then pressed at a high pressure (hereafter, referred to as an "imprint process"). Due to this process, as shown in FIG. 2A, a resist layer 8a is formed which includes a concave section 8c having a shape corresponding to the shape of a concentric recording track section having a predetermined width in a discrete track medium or the shape of a bit section in a patterned medium.

The stamper used in the imprint process is a stamper in which a fine pattern is formed on a metal plate by using a method, such as electron beam lithography. As the material for constituting the stamper, Ni or the like which has satisfactory levels of hardness and durability for withstanding the imprint process is favorably used. However, the material is not particularly limited as long as it meets the aforementioned object.

Then, a portion remaining at the bottom surface of the concave section 8c of the resist layer 8a is removed using methods including a dry etching process, such as ion beam etching and ion milling, and a reactive ion etching method. As a result, as shown in FIG. 2B, a resist pattern 8b is formed in which the protective layer 6 is exposed at the bottom surface of the concave section 8c.

Subsequently, by using a dry etching process such as ion beam etching, a reactive ion etching method, or the like, as shown in FIG. 2C, the protective layer 6 exposed from the concave section 8c in the resist pattern 8b and the magnetic layer 7, which is exposed as a result of the removal of the protective layer 6, are removed in succession. Due to this process, as shown in FIG. 2C, the concave section 4a which is to become the separation layer 5 and a plurality of recording layers 4 which are magnetically separated by the concave section 4a in plan view are formed.

The width of the concave section 4a is preferably as narrow as possible for improving the recording density, but is preferably as wide as possible for filling in the concave section 4a deep down and densely without leaving any gaps with the melted resist described later and for improving the separation properties of the recording layer 4. In addition, the depth of the concave section 4a is preferably as shallow as possible in view of the filling properties of the melted resist with respect to the concave section 4a, but is preferably as deep as possible for improving the separation properties of the recording layer 4.

In the present embodiment, for example, even when the concave section 4a is formed into a fine and deep shape having a minimum width of 100 nm or less, preferably 30 nm or less and a maximum depth of 20 nm or more, the melted resist can readily fill in the concave section 4a densely without leaving any gaps, and the magnetic recording medium 10 having excellent separation properties and is capable of achieving high recording density can be manufactured.

Next, as shown in FIG. 1, the separation layer 5 is formed by preparing a melted resist by melting the resist pattern 8b shown in FIG. 2C and filling in the concave section 4a with the melted resist, followed by curing of the melted resist.

In order to melt the resist pattern 8b herein, a method in which the resist pattern 8b is heated from the outside using an infrared heater or the like, a method in which the resist pattern 8b is heated by irradiating a laser beam thereon, or the like can be employed. However, it is preferable to employ a method in which a laser beam is irradiated onto the resist pattern 8b.

Because the resist pattern 8b formed on the surface of a magnetic recording medium can be readily heated locally with a laser beam, it is possible to efficiently melt the entire resist pattern 8b by a method in which the area being irradiated with a laser beam is moved in a continuous manner. In addition, when melting the resist pattern 8b by irradiating a laser beam, the resist pattern 8b can be melted in a cleaner environment, as compared to the cases where an infrared heater or the like is used for heating the resist pattern 8b from the outside, and thus the process is suited for the manufacturing method of magnetic recording media where dust or the like is a nuisance.

Examples of the laser equipment that can be used in this process include solid state lasers such as a ruby laser, a YAG laser, and a Nd:YAG laser, in addition to gas lasers such as a carbon dioxide laser, a helium neon laser, an argon ion laser, and an excimer laser.

The temperature for melting the resist pattern 8b is preferably within a range from 150° C. to 220° C. (most preferably within a range from 180° C. to 220° C.).

When melted and made into the form of a melted resist, the resist pattern 8b fills in the concave section 4a in a self aligning manner by gravity and/or capillarity. Due to this process, the melted resist fills in the concave section 4a deep down and densely without leaving any gaps.

In addition, the melted resist filled inside the concave section 4a is hardened when the temperature thereof is lowered back to room temperature.

In the present embodiment, it is preferable to conduct a surface inspection using a laser beam after forming the separation layer 5. From the scattering state of the reflected light obtained by irradiating a laser beam on the surface, the surface inspection conducted herein detects the presence and absence of the resist pattern 8b remained on the surface without being melted, whether or not the melted resist filled in the concave section 4a, and the presence and absence of surface defects such as scratches, particles and irregularities.

As the laser beam used in such a surface inspection, a laser beam weaker than those used for melting the resist pattern 8b is employed. Accordingly, for example, it is possible to easily carry out the melting and surface inspection of the resist pattern 8b in succession by a method in which the resist pattern 8b is melted using a laser beam, followed by the surface inspection while lowering the power for irradiating the laser beam. In this case, the frequency of handling a magnetic recording medium in the manufacturing process of the magnetic recording medium is reduced, and thus productivity of the magnetic recording medium can be enhanced even further.

Thereafter, if necessary, etching is conducted for planarizing the surface of the separation layer 5 by employing a dry etching process such as ion milling, a reactive etching method, or the like.

Then, if necessary, a lubricating layer (not shown) is formed by applying a lubricant on the surfaces of the separation layer 5 and the protective layer 6.

In the above described manner, the magnetic recording medium 10 according to the present embodiment and shown in FIG. 1 is manufactured.

The method for manufacturing the magnetic recording medium 10 according to the present embodiment includes: a step for forming the magnetic layer 7 on top of the non-magnetic substrate 1, and then forming the resist pattern 8b constituted of a non-magnetic material on top of the magnetic layer 7; a step for forming the concave section 4a, which is to become the separation layer 5, and a plurality of recording layers 4 that are magnetically separated in plan view by the concave section 4a by removing the magnetic layer 7 that is exposed from the resist pattern 8b; and a step for forming the separation layer 5 by melting the resist pattern 8b to prepare a melted resist and filling in the concave section 4a with the melted resist, followed by curing of the melted resist. Accordingly, it is possible to easily manufacture the magnetic recording medium 10 having a plurality of magnetically separated recording layers 4 and also having excellent surface flatness, in which spaces between the adjacent recording layers 4 are filled in with a non-magnetic material.

More specifically, in the method for manufacturing the magnetic recording medium 10 according to the present embodiment, the resist pattern is melted, thereby filling in the concave section, after forming the recording layers. Accordingly, as compared to the cases where, for example, a plurality of recording layers that are magnetically separated by the concave section are first formed by removing the magnetic layer that is exposed from the resist pattern, and then a layer constituted of a non-magnetic material is formed on the entire surface by removing the resist pattern, followed by the removal of the non-magnetic material on the recording layers so that the non-magnetic material is filling only inside the concave section, the manufacturing process can be dramatically simplified.

In addition, in the method for manufacturing the magnetic recording medium 10 according to the present embodiment, when melting the resist pattern 8b by irradiating a laser beam thereto, the entire resist pattern 8b can be melted efficiently, and the resist pattern 8b can be melted in a cleaner environment, as compared to the cases where an infrared heater or the like is used for heating the resist pattern 8b from the outside.

Furthermore, in those cases where the resist pattern 8b is melted by irradiating a laser beam thereto, and a surface inspection is then carried out using a laser beam after forming the separation layer 5, it is possible to carry out the melting and surface inspection of the resist pattern 8b in succession, and thus productivity of the magnetic recording medium 10 can be enhanced even further.

In addition, in the method for manufacturing the magnetic recording medium 10 according to the present embodiment, when the resist pattern 8b is formed of a thermoplastic organic silicon compound, the effects (1) to (3) shown below can be attained.

(1) The melted resist of a thermoplastic organic silicon compound has low viscosity and surface tension in spite of the high molecular weight thereof, and also exhibits high wettability with respect to the material constituting the recording layer 4 and the protective layer 6. For this reason, the melted resist fills in the concave section 4a in a self aligning manner by gravity and/or capillarity. As a result, the melted resist fills in the concave section 4a densely without leaving any gaps, and thus no gap occurs in the periphery of the recording layer 4 or inside the concave section 4a. Accordingly, corrosion caused by the gap inside the concave section 4a is unlikely to occur, and the magnetic recording medium 10 excellent in terms of durability and reliability can be achieved even when used in a high temperature, high humidity environment.

(2) The melted resist of a thermoplastic organic silicon compound has a low shrinkage factor at the time of curing, and thus distortion caused by curing the melted resist filled inside the concave section 4a is unlikely to occur in the recording layer 4 having a fine structure. Therefore, the recording layer 4 of high definition which is superior in terms of high recording density properties can be readily formed.

(3) The melted resist of a thermoplastic organic silicon compound readily fills in the concave section 4a densely without leaving any gaps, and thus the separation properties of the recording layer 4 as well as the recording density are improved. As a result, the shape of the concave section 4a can be made into an even finer and deeper shape, and thus the magnetic recording medium 10 which includes the recording layer 4 exhibiting superior separation properties and which is excellent in terms of high recording density properties can be manufactured.

In addition, in the method for manufacturing the magnetic recording medium 10 according to the present embodiment, when the resist pattern 8b is formed of a thermoplastic organic silicon compound and the organic silicon compound is a compound that includes a silsesquioxane compound represented by the aforementioned general formula (1), the effects shown below can be attained.

Phenylsilsesquioxane is readily fluidized when being heated by a laser beam at 250° C. or less, flows into a concave section, and then hardens at room temperature, and is thus particularly desirable.

By including the silsesquioxane compound represented by the aforementioned general formula (1), the smoothness of the surface achieved following the curing of the melted resist is excellent. As a result, the distance between the magnetic layer 4 and the magnetic head can be reduced, and the magnetic recording medium 10 which is capable of achieving high recording density can be manufactured.

In addition, because inclusion of the silsesquioxane compound represented by the aforementioned general formula (1) results in excellent etching characteristics with respect to dry etching, a smooth etched surface is obtained after the dry etching process. As a result, the patterns to be formed into a recording track section or a bit section can be formed with high definition, and the recording density of the magnetic recording medium 10 can be enhanced.

Figure 3:
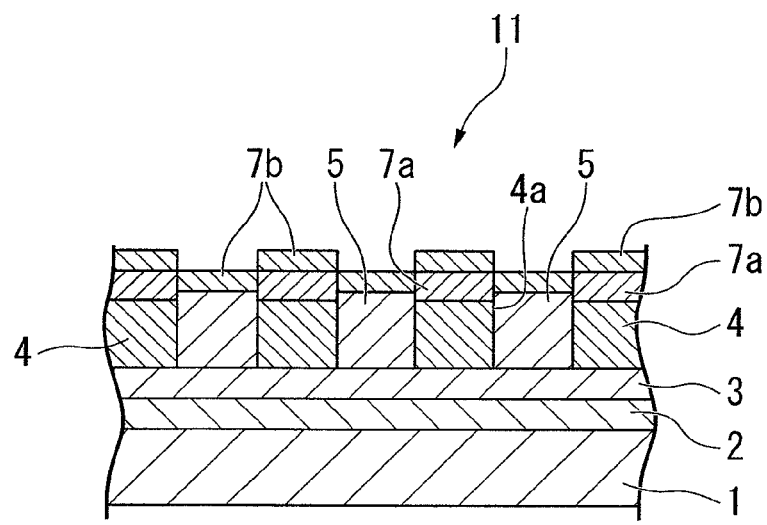
FIG. 3 is a cross sectional view showing another example of a magnetic recording medium manufactured by employing a method for manufacturing a magnetic recording medium according to the present invention, and is showing an enlarged view in which only one portion of the magnetic recording medium is enlarged.

It should be noted that the present invention is in no way limited to the aforementioned embodiments. For example, the protective layer 6 may be consisted of only one layer or may be constituted of two or more layers. FIG. 3 is a cross sectional view showing another example of a magnetic recording medium manufactured by employing a method for manufacturing a magnetic recording medium according to the present invention, and is showing an enlarged view in which only one portion of the magnetic recording medium is enlarged.

The magnetic recording medium 11 shown in FIG. 3 is different from the magnetic recording medium 10 shown in FIG. 1 in that a protective layer is composed of two layers; a first protective layer 7a provided on top of the recording layer 4, and a second protective layer 7b provided on top of the separation layer 5.

The magnetic recording medium 11 shown in FIG. 3 can be formed with a method which is almost the same as the method for forming the magnetic recording medium 10 shown in FIG. 1. In other words, the magnetic recording medium 11 can be formed by a method which is the same as the method for forming the magnetic recording medium 10 shown in FIG. 1 until the step for forming the separation layer 5, followed by formation of the second protective layer 7b on the first protective layer 7a and the separation layer 5. Note that the first protective layer 7a is formed in a similar manner to that for forming the protective layer 6 in the method for forming the magnetic recording medium 10 shown in FIG. 1.

Accordingly, also with the method for manufacturing the magnetic recording medium 11 shown in FIG. 3, the same effects as those described above that are obtained with the method for forming the magnetic recording medium 10 shown in FIG. 1 can be achieved.

In addition, in the method for manufacturing the magnetic recording medium 11 shown in FIG. 3, because a step for forming the second protective layer 7b on the first protective layer 7a and the separation layer 5 is conducted after completing those steps until the separation layer 5 is formed, the magnetic recording medium 11 having a protective layer composed of two layers (i.e., the first protective layer 7a provided on top of the recording layer 4, and the second protective layer 7b provided on top of the separation layer 5) and which is even more excellent in terms of durability and reliability can be manufactured.

<Magnetic Recording and Reproducing Apparatus>

Figure 4:
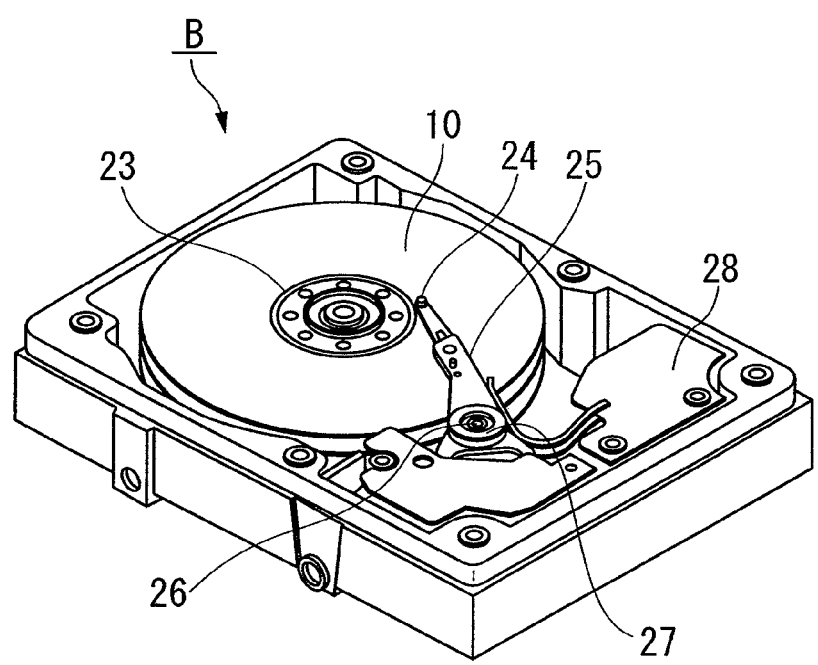
FIG. 4 is a schematic configuration diagram showing an example of a magnetic recording and reproducing apparatus of the present invention.

Next, an explanation is given by using a magnetic recording and reproducing apparatus that includes the magnetic recording medium 10 shown in FIG. 1 as an example of the magnetic recording and reproducing apparatus according to the present invention. FIG. 4 is a schematic configuration diagram showing an example of a magnetic recording and reproducing apparatus of the present invention. A magnetic recording and reproducing apparatus B shown in FIG. 4 includes the magnetic recording medium 10 shown in FIG. 1; a spindle motor 23 serving as a driving unit that supports and rotates the magnetic recording medium 10; a magnetic head 24; a head actuator 25 having a suspension in which the magnetic head 24 is installed at the end thereof, and supporting the magnetic head 24 so as to be freely movable with respect to the magnetic recording medium 10; a rotating shaft 26 that supports the head actuator 25 in a freely rotatable manner; a voice coil motor 27 that rotates and positions the head actuator 25 via the rotating shaft 26; and a signal processing circuit 28.

The magnetic head 24 records information composed of magnetic signals on the magnetic recording medium 10, and also reproduces the information therefrom. As the magnetic head 24, a magnetic head suitable for high recording density and having an anisotropic magnetoresistive (AMR) element using an AMR effect, a giant magnetoresistive (GMR) element using a GMR effect, a tunnel magnetoresistive (TMR) element using a tunnel effect or the like as a reproducing element can be used.

The magnetic recording and reproducing apparatus B shown in FIG. 4 includes the magnetic recording medium 10 having a plurality of magnetically separated recording layers 4 and also having excellent surface flatness, in which spaces between the adjacent recording layers 4 are filled in with a non-magnetic material; and the magnetic head, and thus superior properties in terms of high recording density as well as stable floating properties of the magnetic head 24 can be achieved.

For example, in the magnetic recording and reproducing apparatus B shown in FIG. 4, the floating level of the magnetic head 24 can be made at a height of 0.005 μm to 0.020 μm which is lower than that in the conventional apparatuses, and thus the magnetic recording and reproducing apparatus B capable of achieving a higher output and a higher device S/N ratio, and is also excellent in terms of reliability can be provided.

Moreover, when the signal processing circuit 28 which adopts the maximum likelihood decoding is incorporated in the magnetic recording and reproducing apparatus B according to the present embodiment, a recording density can be improved even further. More specifically, for example, an adequate S/N ratio can be attained even when recording and reproducing at a track density of 100 kTPI or higher, a line recording density of 1,000 kbpI or higher, and an areal recording density of 100 Gbits per square inch or higher.

Examples

Hereinafter, the present invention will be described in detail with reference to examples.

Example

A discrete track medium as a working example of a magnetic recording medium according to the present invention was manufactured in accordance with the following manufacturing method.

A non-magnetic substrate made of a disk shaped, glass substrate (manufactured by Konica Minolta Holdings, Inc. and having an outer diameter of 1.89 inches) for hard disks (HD) was washed and was then placed in a vacuum chamber of a film forming apparatus, and the inside of the vacuum chamber was evacuated to $1.0 \times 10^{-5}$ Pa or less. Thereafter, by depositing 35 nm of $_{65}$Fe—$_{25}$Co—$_{10}$B (atomic %) without heating, 0.8 nm of Ru, and 35 nm of 65Fe—$_{25}$Co—$_{10}$B (atomic %) using a direct current (DC) sputtering method, a soft magnetic backing layer was formed.

Subsequently, by using a DC sputtering method, 20 nm of an orientation control film composed of Ru, 12 nm of a magnetic layer composed of $_{65}$Co—$_{10}$Cr—$_{15}$Pt—$_{10}$SiO$_2$ (atomic %) and which was to become a recording layer, and 4 nm of a protective layer composed of carbon were formed.

Then, the medium on which the respective layers including the lastly-formed protective layer were formed was taken out from the inside of the vacuum chamber, and a resist solution was applied onto the protective layer by a spin coating process, and the resulting medium was then baked in a thermostatic bath set at about 100° C. for 20 minutes to remove excess solvents. Note that as the resist solution, a solution was used which was formed by containing 5% by mass of polyphenylsilsesquioxane, which was a silsesquioxane compound constituted of a repeating unit having a structure represented by the aforementioned general formula (2) where $R^1$ and $R^2$ represented a phenyl group (SR-20 manufactured by Konishi Chemical Industry Co., Ltd. and having a weight average molecular weight (the polystyrene equivalent value) determined by GPC of 5,470), with respect to 100% by mass of propylene glycol monomethyl ether acetate (manufactured by Daicel Chemical Industries, Ltd.) which was serving as a solvent. In addition, the amount of the applied resist solution was 4 ml, and the thickness thereof was 60 mm.

Subsequently, a imprint process was conducted using a stamper, and a resist layer which included a concave section having a shape corresponding to the shape of a recording track section was formed on the protective layer. Note that as the stamper, a stamper made of Ni and having concentric concave grooves, in which a pitch in the recording track section (i.e., track pitch) was 150 nm, formed therein was used.

Then, the non-magnetic substrate on which the respective layers including the lastly-formed resist layer were formed was placed inside the vacuum chamber, and a portion remaining at the bottom surface of the concave section of the resist layer was removed using ion beam etching, thereby forming a resist pattern in which the protective layer was exposed at the bottom surface of the concave section. Subsequently, by using ion beam etching, the protective layer exposed from the concave section in the resist pattern and the magnetic layer, which was exposed as a result of the removal of the protective layer, were removed in succession. Due to this process, the concave section, which was to become a separation layer, and a plurality of recording layers which were magnetically separated by the concave section in plan view were formed.

The concave section formed herein which was to become a separation layer had a width of 80 nm. In addition, the depth of the concave section which was to become a separation layer was 40 nm.

Then, by irradiating a laser beam onto the resist pattern, the resist pattern was melted to be formed into a melted resist, and the melted resist filled inside the concave section and was then hardened at room temperature by standing, thereby forming a separation layer.

Note that a semiconductor laser was used as the laser equipment, and at the time of melting the resist pattern, the wavelength of the laser beam was 408 nm, a spot diameter which corresponded to the irradiated area of the laser beam was 5 μm, an output of the laser beam was 20 mW, and the non-magnetic substrate was rotated at a rotating speed of 510 rpm.

In addition, after forming the separation layer, a surface inspection using a laser beam was successively conducted. At the time of conducting the surface inspection, the wavelength of the laser beam was 408 nm, a spot diameter which corresponded to the irradiated area of the laser beam was 5 μm, an output of the laser beam was 5 mW, and the non-magnetic substrate was rotated at a rotating speed of 10,000 rpm.

In this surface inspection, from the scattering state of the reflected light obtained by irradiating a laser beam on the surface, it was confirmed that the resist pattern was completely melted and thus no resist pattern remained on the surface without being melted, and that the melted resist filled inside the concave section.

Thereafter, a protective layer made of diamond like carbon and having a thickness of 4 nm was formed on the protective layer and the separation layer using a CVD method, and a lubricant was then applied thereon, thereby yielding a magnetic recording medium.

(Evaluation of Glide Hits)

Next, a glide test was conducted on the magnetic recording medium manufactured in the above working example. In the glide test, a mechanical spacing between an inspection head and the surface of the magnetic recording medium was set to 8 nm, and the glide test was conducted by counting the number of signals (glide hits) from the inspection head which were caused by the collision with the projections and protrusions on the surface of the magnetic recording medium.

(Evaluation of Corrosion Resistance)

In addition, corrosion resistance of the magnetic recording medium manufactured in the above working example was evaluated. The evaluation of corrosion resistance was conducted by holding the magnetic recording medium in an atmospheric environment where the temperature was 80° C. and the humidity was 85% for 96 hours, and then counting the number of corrosion spots generated on the surface of the magnetic recording medium and having a diameter of 5 microns or greater.

From the results of the evaluation of glide hits and the evaluation of corrosion resistance, with the magnetic recording medium manufactured in the working example, it was confirmed that no glide hits or corrosion spots were observed, and that stable floating properties of the magnetic head as well as high environmental resistance were achieved. It is thought that this is because the magnetic recording medium manufactured in the working example had an excellent surface flatness, in which spaces between the adjacent recording layers were filled in densely with a non-magnetic material without leaving any gaps.

The present invention can be applied to a method for manufacturing a magnetic recording medium to be used in a hard disk device or the like, and a magnetic recording and reproducing apparatus.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for manufacturing a magnetic recording medium comprising:
    a step for forming a magnetic layer on top of a non-magnetic substrate, and then forming a resist pattern constituted of a non-magnetic material on top of the magnetic layer;
    a step for forming a concave section, which is to become a separation layer, and a plurality of recording layers that are magnetically separated in plan view by the concave section by removing the magnetic layer that is exposed from the resist pattern; and
    a step for forming the separation layer by melting the resist pattern to prepare a melted resist and filling in the concave section with the melted resist, followed by curing of the melted resist.

2. The method for manufacturing a magnetic recording medium according to claim 1, wherein the resist pattern is melted by irradiating a laser beam thereto.

3. The method for manufacturing a magnetic recording medium according to claim 2, further comprising a step for conducting a surface inspection using a laser beam after forming the separation layer.

4. The method for manufacturing a magnetic recording medium according to claim 1, wherein the resist pattern is constituted of a thermoplastic organic silicon compound.

5. The method for manufacturing a magnetic recording medium according to claim 1,
    wherein the thermoplastic organic silicon compound includes a silsesquioxane compound represented by general formula (1) shown below:

$$R^1R^2Si_2O_3 \qquad (1)$$

(in the above general formula (1), $R^1$ and $R^2$ represent an alkyl group of 1 to 8 carbon atoms which may be substituted, an alkenyl group of 2 to 8 carbon atoms which may be substituted, an alkoxy group of 1 to 6 carbon atoms which may be substituted, or an aryl group of 6 to 10 carbon atoms which may be substituted, and $R^1$ and $R^2$ may be the same or different from each other).

6. The method for manufacturing a magnetic recording medium according to claim 5,
    wherein the silsesquioxane compound is a compound having a weight average molecular weight (the polystyrene equivalent value) determined by gel permeation chromatography of 1,500 to 30,000.

7. The method for manufacturing a magnetic recording medium according to claim 5, wherein the silsesquioxane compound is phenylsilsesquioxane.

8. The method for manufacturing a magnetic recording medium according to claim 5,
    wherein the silsesquioxane compound is constituted of a repeating unit having a structure represented by general formula (2) shown below and is a compound having a weight average molecular weight (the polystyrene equivalent value) determined by gel permeation chromatography of 1,000 to 100,000;

[Chemical Formula 1]

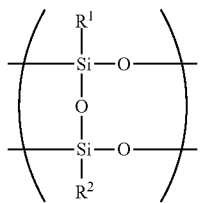

(2)

(in the above general formula (2), $R^1$ and $R^2$ represent an alkyl group of 1 to 8 carbon atoms which may be substituted, an alkenyl group of 2 to 8 carbon atoms which may be substituted, an alkoxy group of 1 to 6 carbon atoms which may be substituted, or an aryl group of 6 to 10 carbon atoms which may be substituted, and $R^1$ and $R^2$ may be the same or different from each other).

9. The method for manufacturing a magnetic recording medium according to claim 8, wherein $R^1$ and $R^2$ in the above general formula (2) represent a methyl group or a phenyl group.

* * * * *